(12) United States Patent
Waite et al.

(10) Patent No.: US 8,549,417 B2
(45) Date of Patent: Oct. 1, 2013

(54) SYSTEM, METHOD AND COMPUTER PROGRAM PRODUCT FOR EDITING AN ON-DEMAND DATABASE SERVICE GRAPHICAL USER INTERFACE

(75) Inventors: Andrew Waite, Novato, CA (US); Doug Chasman, Pittsford, NY (US)

(73) Assignee: salesforce.com, inc., San Francisco, CA (US)

( * ) Notice: Subject to any disclaimer, the term of this patent is extended or adjusted under 35 U.S.C. 154(b) by 918 days.

(21) Appl. No.: 12/174,975

(22) Filed: Jul. 17, 2008

(65) Prior Publication Data
US 2009/0037828 A1 Feb. 5, 2009

Related U.S. Application Data

(60) Provisional application No. 60/950,824, filed on Jul. 19, 2007.

(51) Int. Cl.
*G06F 3/00* (2006.01)

(52) U.S. Cl.
USPC ........................................................ 715/760

(58) Field of Classification Search
USPC ........................................................ 715/760
See application file for complete search history.

(56) References Cited

U.S. PATENT DOCUMENTS

| | | |
|---|---|---|
| 6,342,907 B1 | 1/2002 | Petty et al. |
| 7,062,502 B1 | 6/2006 | Kesler |
| 7,181,468 B2 * | 2/2007 | Spring et al. ............................ 1/1 |
| 7,209,929 B2 | 4/2007 | Dominguez, Jr. et al. ..... 707/103 |
| 7,698,160 B2 | 4/2010 | Beaven et al. |
| 7,730,478 B2 | 6/2010 | Weissman |
| 7,779,039 B2 | 8/2010 | Weissman et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,181,104 B1 * | 5/2012 | Helfand et al. ................ 715/234 |
| 8,275,836 B2 | 9/2012 | Beaven et al. |
| 8,280,865 B1 * | 10/2012 | Edelman et al. .............. 707/695 |
| 2003/0025732 A1 | 2/2003 | Prichard |
| 2003/0225829 A1 * | 12/2003 | Pena et al. ..................... 709/203 |
| 2003/0233404 A1 | 12/2003 | Hopkins ........................ 709/203 |
| 2004/0148576 A1 * | 7/2004 | Matveyenko et al. ......... 715/530 |

(Continued)

FOREIGN PATENT DOCUMENTS
WO 2006119366 A1 11/2006

OTHER PUBLICATIONS

U.S. Appl. No. 60/828,192, filed Oct. 4, 2006.
U.S. Appl. No. 10/817,161, filed Apr. 2, 2004.

(Continued)

*Primary Examiner* — William Bashore
*Assistant Examiner* — Hien Duong
(74) *Attorney, Agent, or Firm* — Zilka-Kotab, PC

(57) ABSTRACT

In accordance with embodiments, there are provided mechanisms and methods for editing an on-demand database service graphical user interface. These mechanisms and methods for editing an on-demand database service graphical user interface can enable embodiments to edit desired portions of the interface, in a more flexible manner. The ability of embodiments to provide such additional flexibility may lead to more efficient and effective interface editing.

15 Claims, 9 Drawing Sheets

(56) References Cited

U.S. PATENT DOCUMENTS

| | | | |
|---|---|---|---|
| 2005/0065925 A1 | 3/2005 | Weissman et al. | 707/4 |
| 2005/0223022 A1 | 10/2005 | Weissman et al. | 707/102 |
| 2005/0283478 A1 | 12/2005 | Choi et al. | 707/9 |
| 2006/0036965 A1 | 2/2006 | Harris et al. | |
| 2006/0095835 A1* | 5/2006 | Kennedy et al. | 715/513 |
| 2006/0206804 A1 | 9/2006 | Barnett | |
| 2006/0206834 A1 | 9/2006 | Fisher et al. | 715/777 |
| 2006/0259524 A1* | 11/2006 | Horton | 707/201 |
| 2007/0083851 A1 | 4/2007 | Huang et al. | |
| 2007/0088741 A1* | 4/2007 | Brooks et al. | 707/103 R |
| 2007/0150368 A1* | 6/2007 | Arora et al. | 705/26 |
| 2007/0168931 A1* | 7/2007 | Martin et al. | 717/104 |
| 2007/0239726 A1* | 10/2007 | Weiss et al. | 707/10 |
| 2008/0059504 A1* | 3/2008 | Barbetta et al. | 707/102 |
| 2008/0086717 A1* | 4/2008 | Brunn et al. | 717/117 |
| 2009/0006454 A1* | 1/2009 | Zarzar et al. | 707/102 |

OTHER PUBLICATIONS

International Search Report and Written Opinion from PCT Application No. PCT/US08/08777 mailed on Oct. 23, 2008.

Zhao, C et al., "Database User Interface Design Editor," Database Systems for Advanced Applications '93, International Symposium on Database Systems for Advanced Applications World Scientific Singapore, 1993, pp. 123-130.

Extended Search Report from European Application No. 08780246.8 dated Feb. 15, 2011.

Office Action from Taiwan Patent Application No. 097127256, dated Apr. 18, 2012.

Examination Report from European Patent Application No. 08 780 246.8, dated Jan. 11, 2013.

* cited by examiner

*← 300*

| Standard Actions | | | | |
|---|---|---|---|---|
| Action | Label | Name | Overridden | Apex Page Nane |
| Override | Overview | Overview | ☐ | |
| Override | List Views | List Views | ☑ | opportunityContactView |
| Override | View | View | ☐ | |
| Override | Edit | Edit | ☐ | |
| Override | Delete | Delete | ☐ | |
| Override | Clone | Clone | ☐ | |
| Override | New | New | ☐ | |

New Web Tab

Step 2. Define Content and Display Properties

Tab Content Definition

Choose how the tab content will be defined.

Tab Type  [ --None-- ▾ ]

Display Properties

Tab Label  [                    ]

Tab Style  [         ] 🔍

*FIG. 3A*

```
Visualforce Page
/apex/accountBubbles                                         Help for this Page ⓘ

┌─────────────────────────────────────────────────────────────────────────────┐
│ Page Edit              [Save][Quick Save][Cancel]  Component Reference      │
│ ┌─────────────────────────────────────────────────────────────────────────┐ │
│ │ Page Information                                    ǀ = Required Information│
│ │   Label   [accountBubbles]               Name  [accountBubbles]          │ │
│ │ Description                                                               │ │
│ │           [                              ]                                │ │
│ │                                                                           │ │
│ │  🔍 ⇨ | ◁ ▷ | A A                                                         │ │
│ │  1 <apex:page standardController="Account" extensions="accountExt">       │ │
│ │  2     <apex:sectionHeader title="Account" subtitle="{!account.name}"/>   │ │
│ │  3     <apex:form >                                                       │ │
│ │  4        <apex:pageBlock title="Account Detail">                         │ │
│ │  5            <apex:pageBlockButtons >                                    │ │
│ │  6                <apex:commandButton value="Edit" action="{!edit}"/><apex:co│
│ │  7            </apex:pageBlockButtons>                                    │ │
│ │  8            <apex:pageBlockSection >                                    │ │
│ │  9                <apex:outputField value="{!account.ownerid}"/><apex:outputF│
│ │ 10                <apex:outputField value="{!account.name}"/><apex:outputFiel│
│ │ 11                <apex:outputField value="{!account.parentId}"/><apex:output│
│ │ 12                <apex:outputField value="{!account.accountNumber}"/><apex:o│
│ │ 13            </apex:pageBlockSection>                                    │ │
│ │ 14        </apex:pageBlock>                                               │ │
│ │ 15        <apex:pageBlock title="Cases" id="caseBubbles">                 │ │
│ │ 16            <apex:facet name="header">                                  │ │
│ │ 17                <apex:actionstatus id="status">                         │ │
│ │ 18                    <apex:facet name="start"><apex:image value="{!URLFOR($R│
│ │ 19                    <apex:facet name="stop">                            │ │
│ │ 20                        <apex:panelGroup >                              │ │
│ │ 21                            <apex:panelGroup rendered="{!selectedSize <> 1}│
│ │ 22                                <apex:image value="/img/s.gif" height="13"│
│ │ 23                            </apex:panelGroup>                          │ │
│ │ 24                            <apex:panelGroup rendered="{!selectedSize == 1}│
│ │ 25                                <apex:image value="/img/s.gif" height="13"│
│ │ 26                            </apex:panelGroup>                          │ │
│ │ 27                        </apex:panelGroup>                              │ │
│ │ 28                    </apex:facet>                                       │ │
│ │ 29                </apex:actionStatus>                                    │ │
│ │                                                                           │ │
│ │  Position:   Ln 55, Ch 13     Total:   Ln 55, Ch 4678                     │ │
│ └─────────────────────────────────────────────────────────────────────────┘ │
└─────────────────────────────────────────────────────────────────────────────┘
```

```
<apex:page controller="customOpportunity2.OppCon">
<html>
<head> </head>
<body>
<apex:header sidebar="true" subject="Opportunity"/>
<apex:sectionHeader title="Opportunity" subtitle="{!opp.name}"/>
<apex:detail relatedList="false" subject="{!opp.id}"/>
</body>
</html>
</apex:page>
```

| Utility | Coarse | Granular(Input) | Granular(Display) |
|---|---|---|---|
| <apex:page> | <apex:relatedList> | <apex:form> | <apex:text> |
| <apex:composition> | <apex:detail> | <apex:inputField> | <apex:link> |
| <apex:define> | <apex:sidebar> | <apex:inputText> | <apex:param> |
| <apex:insert> | <apex:listview> | <apex:inputTextarea> | <apex:dataList> |
| <apex:convertDateTime> | <apex:scontrol> | <apex:commandButton> | <apex:dataTable> |
| <apex:convertNumber> | <apex:listColumns> | <apex:commandLink> | <apex:rating> |
| <apex:include> | <apex:pageLayoutSection> | <apex:inputCheckbox> | <apex:column> |
| <apex:repeat> | <apex:overviewList> | <apex:inputHidden> | <apex:graphicImage> |
| <apex:facet> | <apex:myTasks> | <apex:inputSelect> | <apex:collapsiblePanel> |
| | <apex:calendarList> | <apex:inputSelectOption> | <apex:accordionPanel> |
| | <apex:report> | <apex:inputSelectOptions> | <apex:panelGroup> |
| | <apex:dashboard> | <apex:inputSelectOptionGroup> | <apex:panelTab> |
| | <apex:quickCreate> | <apex:inputSecret> | <apex:pageBlock> |
| | <apex:calendar> | <apex:inputMultiSelect> | <apex:pageBlockSection> |
| | <apex:calendarItem> | <apex:inputCalendar> | <apex:label> |
| | <apex:relationshipMap> | <apex:inputFileUpload> | <apex:iframe> |
| | <apex:relationshipMapItem> | <apex:inputRadio> | <apex:sectionHeader> |
| | | <apex:inputDate> | <apex:stylesheet> |
| | | <apex:inputHTML> | <apex:recentItems> |
| | | <apex:inputSlider> | <apex:tree> |
| | | <apex:selectManyCheckbox> | <apex:treeColumn> |
| | | <apex:sidebarSearch> | <apex:timeline> |
| | | | <apex:chart> |
| | | | <apex:noteBox> |
| <apex:ajaxSupport> | | | |
| <apex:ajaxCommandLink> | | | |
| <apex:ajaxCommandButton> | | | |
| <apex:ajaxOutputPanel> | | | |
| <apex:ajaxPoll> | | | |
| <apex:ajaxRegion> | | | |
| <apex:ajaxStatus> | | | |

FIG. 5

SYSTEM, METHOD AND COMPUTER PROGRAM PRODUCT FOR EDITING AN ON-DEMAND DATABASE SERVICE GRAPHICAL USER INTERFACE

CLAIM OF PRIORITY

This application claims the benefit of U.S. Provisional Patent Application 60/950,824 entitled "METHOD AND SYSTEM FOR DEVELOPING USER INTERFACES FOR ON DEMAND APPLICATIONS," by Chris Fry et al., filed Jul. 19, 2007, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to editing graphical user interfaces associated with database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to edit graphical user interfaces associated with applications that are executed in conjunction with the foregoing database systems. To date, such editing has been restrictive in that the original programming language associated with the entire interface must be edited and republished. Unfortunately, such limitations severely inhibit the ability of the user to edit only portions of the graphical user interface, etc.

BRIEF SUMMARY

In accordance with embodiments, there are provided mechanisms and methods for editing an on-demand database service graphical user interface. These mechanisms and methods for editing an on-demand database service graphical user interface can enable embodiments to edit desired portions of the interface, in a more flexible manner. The ability of embodiments to provide such additional flexibility may lead to more efficient and effective interface editing.

In an embodiment and by way of example, a method is provided for editing an on-demand database service graphical user interface. In use, a plurality of markup tags are received which define at least a portion of a desired graphical user interface associated with an on-demand database service. Further, at least a portion of a previous graphical user interface is substituted with the at least a portion of the desired graphical user interface utilizing the markup tags.

While the present invention is described with reference to an embodiment in which techniques for editing an on-demand database service graphical user interface are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

FIG. 3A shows a user interface for defining content and display properties, in accordance with one embodiment.

FIG. 3B shows a setup user interface for editing an on-demand database service graphical user interface, in accordance with one embodiment.

FIG. 4A shows a markup that defines an element of a user interface for editing an on-demand database service graphical user interface, in accordance with one embodiment.

FIG. 5 shows an interface for displaying a plurality of graphical user interface components, in accordance with one embodiment.

DETAILED DESCRIPTION

General Overview

Systems and methods are provided for editing an on-demand database service graphical user interface.

To date, editing database system graphical user interfaces has been restrictive in that the original programming language associated with the entire interface must be edited and republished. Unfortunately, such limitations severely inhibit the ability of the user to edit only portions of the graphical user interface, etc. Thus, mechanisms and methods provided herein for editing an on-demand database service graphical user interface can enable embodiments to edit desired portions of the interface, in a more flexible manner. The ability of embodiments to provide such additional flexibility may lead to more efficient and effective interface editing.

Next, mechanisms and methods for editing an on-demand database service graphical user interface will be described with reference to exemplary embodiments.

Figure 1:
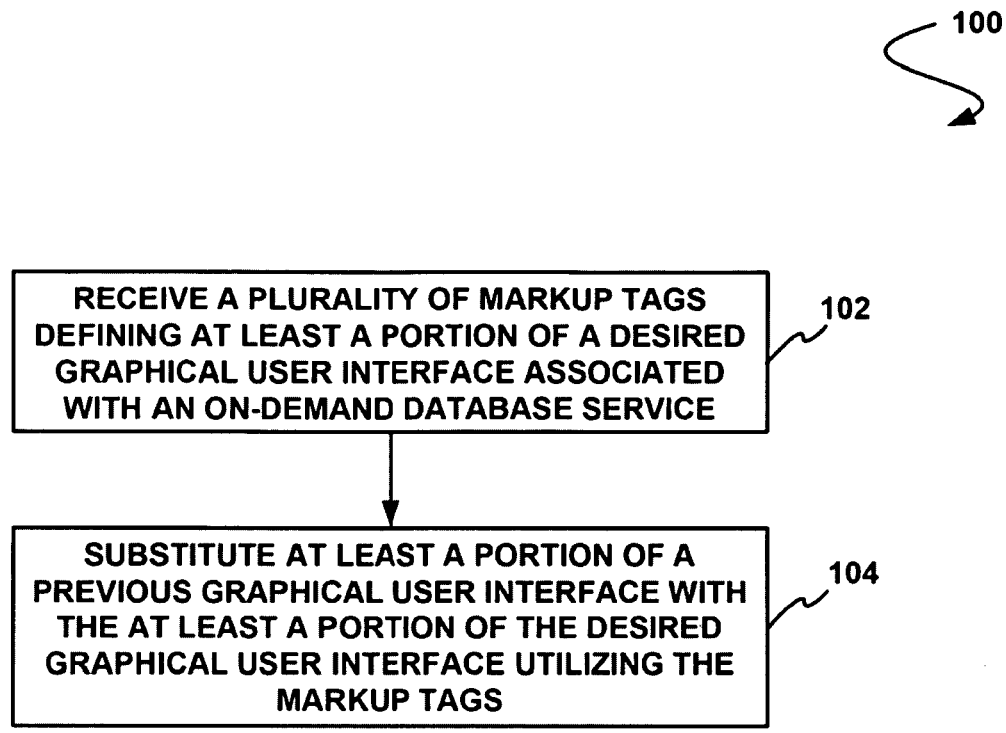
FIG. 1 shows a method for editing an on-demand database service graphical user interface, in accordance with one embodiment.

FIG. 1 shows a method 100 for editing an on-demand database service graphical user interface, in accordance with one embodiment. As shown, a plurality of markup tags defining at least a portion of a desired graphical user interface associated with an on-demand database service are received. See operation 102.

In the context of the present description, an on-demand database service may include any service that relies on a database system that is accessible over a network. In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

With further reference to FIG. 1, at least a portion of a previous graphical user interface is substituted with the at least a portion of the desired graphical user interface utilizing the markup tags. See operation 104. An entire desired graphical user interface or a portion of the desired graphical user interface may be substituted for the entire previous graphical user interface or a portion of the previous graphical user interface.

Furthermore, the desired graphical user interface may include a variety of interfaces. For example, in various embodiments, the desired graphical user interface may include at least a portion of an e-mail interface, at least a portion of a search results interface, at least a portion of a home page interface, at least a portion of a configuration interface, and/or any other type of interface. Additionally, as an option, the desired graphical user interface may be displayed after the substitution. In this case, the desired graphical user interface may be displayed, as configured by a user, including portions of the previous user interface.

It should be noted that the markup tags may include any tags capable of defining at least a portion of a graphical user interface. For example, in various embodiments, the markup tags may include tags corresponding to a markup language such as HTML, XML, XHTML, etc.

Furthermore, the markup tags may be received in a variety of ways. For example, in one embodiment, the markup tags may be received utilizing an editor interface. In this case, the editor interface may include a web-based interface.

In one embodiment, the web based interface may be launched from a user interface. For example, a plurality of options for substituting the at least a portion of the previous graphical user interface may be displayed. Thus, a selection of at least one of the options may be received, and the web-based interface may be displayed in response to the selection.

The options may be displayed using a variety of techniques. For example, the options may be displayed and the selection may be received utilizing a drop down menu. As another example, the options may be displayed as check boxes and the selection may be received utilizing the check boxes.

In another embodiment, a plurality of graphical user interface components may be displayed. In this case, the graphical user interface components may include a plurality of pre-defined graphical user interface components of a graphical user interface component library. As an option, the markup tags may be received in response to the selection of at least one of the graphical user interface components.

As another option, the graphical user interface components may be displayed utilizing an editor interface with which the markup tags are received. In this case, the graphical user interface components may be displayed in response to a request received from a user utilizing the editor interface. Upon selection of one or more of the graphical user interface components, text in the editor interface may be updating indicating the selection.

Figure 2:
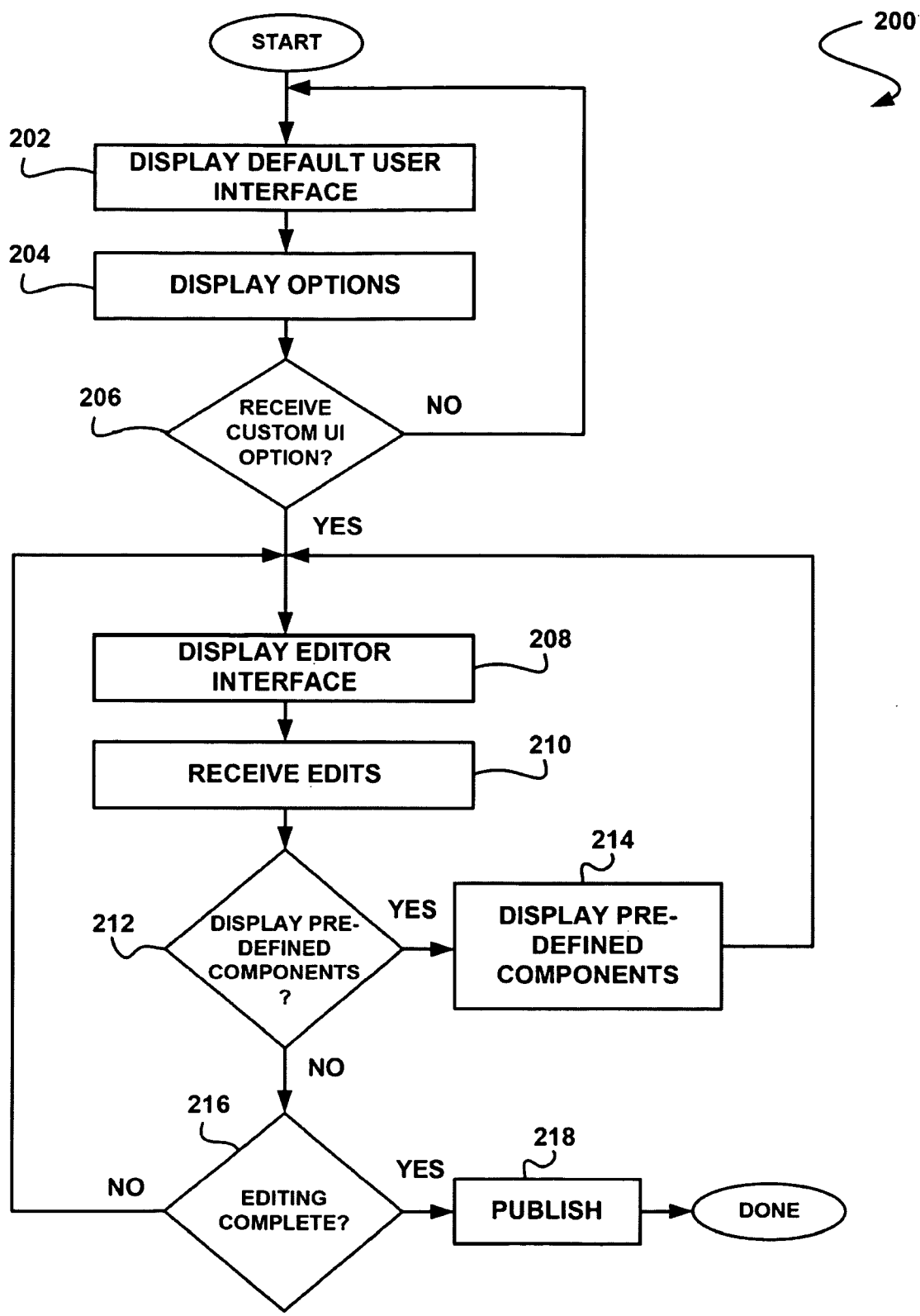
FIG. 2 shows a method for editing an on-demand database service graphical user interface, in accordance with another embodiment.

FIG. 2 shows a method 200 for editing an on-demand database service graphical user interface, in accordance with another embodiment. As an option, the present method 200 may be implemented in the context of the functionality of FIG. 1. Of course, however, the method 200 may be carried out in any desired environment. The aforementioned definitions may apply during the present description.

As shown, a default user interface is displayed. See operation 202. Options for substituting a portion of the default user interface with a customized portion of a user interface are then displayed. See operation 204.

It is then determined whether a custom user interface option has been selected. See operation 206. If it is determined that a custom interface option has been selected, a web-based editor interface is then displayed. See operation 208. In this case, the editor interface may allow the insertion of markup tags to customize the user interface.

Edits are then received using the editor interface. See operation 210. In this case, the edits may be inserted by a user. As an option, the user may type the edits into the editor interface. As another option, the user may paste the edits into the user interface. As still another option, the user may drag and drop the edits into the user interface. Still yet, the user may select the edits from a menu of potential edits. It should be noted that the edits may include markup tags and/or any other edits capable of editing an interface.

Once the edits have been received, it is determined whether to display pre-defined components for editing the user interface. See operation 212. In this case, the determination whether to display the pre-defined components may be made by a user.

For example, a user may elect to display the predefined components by selecting a button on the editing interface. As another option, the pre-defined components may be determined to be displayed automatically.

If it is determined to display the pre-defined components, the pre-defined graphical user interface components of a graphical user interface component library are displayed. See operation 214. As an option, the pre-defined components may be displayed as an interface separate from the editing interface. As another option, the pre-defined components may be displayed using the editing interface.

The pre-defined components may include any number of pre-defined components capable of being used to edit the user interface. In one embodiment, selection of a pre-defined component may cause the insertion of computer code and/or one or more markup tags into a window of the editing interface. In another embodiment, a user may have the ability to drag and drop the pre-defined components into the window of the editing interface. In still another embodiment, selecting a pre-defined component may display additional information corresponding to that component.

Once the determination has been made whether to display the pre-defined components, it is determined whether the editing is complete. See operation 216. As an option, a user may indicate that the editing is complete. For example, a user may indicate the editing is complete by selecting a publish option, closing the editor interface, or using various other techniques.

If it is determined that the editing is complete, the customized user interface is published. See operation 218. In this case, the customized interface may include portions of the default interface, as well as the custom interface portions. As another option, the interface may include a fully custom user interface. In this way, a user may edit desired portions of an interface and publish the edited interface in a flexible, efficient, and effective manner.

FIG. 3A shows a user interface 300 defining content and display properties, in accordance with one embodiment. As an option, the user interface 300 may be implemented in the context of the functionality of FIGS. 1-2. Of course, however, the user interface 300 may be implemented in any desired environment. Again, the aforementioned definitions may apply during the present description.

As shown, the user interface 300 may include a plurality of options for substituting a portion of a default user interface in order to produce a customized interface. For example, the user interface 300 may include one or more standard or default characteristics of an interface to be displayed. In this case, the user interface 300 may present a user with an option to include the one or more default characteristics in the customized interface.

In one embodiment, the user may select the one or more default characteristics by selecting a check box. In another embodiment, the user may select the one or more default characteristics using a drop down menu. In still another embodiment, the user may select the one or more default characteristics on a representative default graphical user interface.

As an option, the user may have the option to choose a default interface from which to base the custom interface. In these cases, the user may have the option to insert a URL of the desired default interface and/or select the default interface from a list of default interfaces. As another option, the default interface may be a standardized default interface.

FIG. 3B shows a setup user interface 350 for editing an on-demand database service graphical user interface, in accordance with one embodiment. As an option, the user interface 350 may be implemented in the context of the functionality of FIGS. 1-3A. Of course, however, the user interface 350 may be implemented in any desired environment. In use, the interface 350 may serve as a webservices API mechanism to edit a graphical user interface definition.

FIG. 4A shows a markup that defines an element of a user interface 400 for editing an on-demand database service graphical user interface, in accordance with one embodiment. As an option, the user interface 400 may be implemented in the context of the functionality of FIGS. 1-3. Of course, however, the user interface 400 may be implemented in any desired environment. Further, the aforementioned definitions may apply during the present description.

As shown, a web based interface 402 may be displayed including one or more configurable or replaceable portions 404. As an option, a user may have the option to edit, delete, clone, or update the portions 404. In these cases, the interface 402 may include buttons presenting the user with this various functionality for each portion.

In one embodiment, an editing interface window 406 may be displayed when the user elects to edit one of the portions 404. In this case, the editing interface window 406 may allow the user to insert or remove components or objects associated with the portions 404. Furthermore, the editing interface 406 may present default and/or custom markup tags to the user in a text format. As another option, the user may have the ability to access a library including a plurality of graphical user interface components to be used with the interface 402.

Figure 4B:
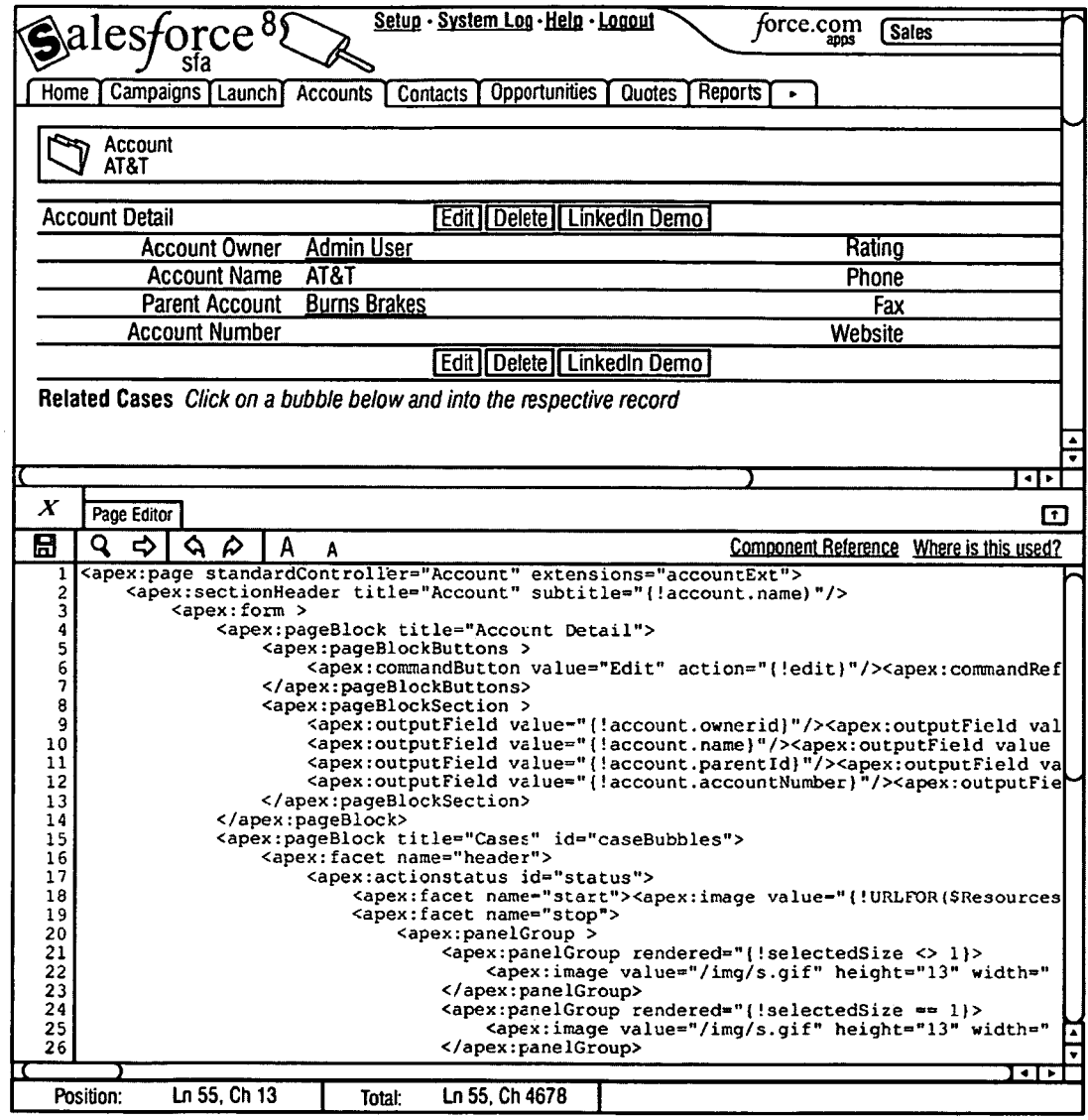
FIG. 4B shows a development mode user interface for editing an end user interface from a normal runtime location of that user interface, in accordance with one embodiment.

FIG. 4B shows a development mode user interface 450 for editing an end user interface from a normal runtime location of that user interface, in accordance with one embodiment. As an option, the user interface 450 may be implemented in the context of the functionality of FIGS. 1-4A. Of course, however, the user interface 450 may be implemented in any desired environment.

As an option, the development mode user interface 450 may be implemented as an in-place mechanism to edit a user interface of an end user from the normal runtime location of that user interface. In this way, the interface 450 may serve as a webservices API mechanism for editing a graphical user interface definition.

In one embodiment, graphical user interface components may be displayed utilizing the interface 450 with which the markup tags are received. In this case, the graphical user interface components may be displayed in response to a request received from a user utilizing the interface 450. Upon selection of one or more of the graphical user interface components, text in the interface 450 may be updating indicating the selection.

FIG. 5 shows an interface 500 for displaying a plurality of graphical user interface components, in accordance with one embodiment. As an option, the interface 500 may be implemented in the context of the functionality of FIGS. 1-4. Of course, however, the interface 500 may be implemented in any desired environment. Once again, the aforementioned definitions may apply during the present description.

As shown, the interface 500 may include graphical user interface components to be used to customize an interface. In this case, the components may include any component to be used with a graphical user interface including, image components, frames, timelines, charts, checkboxes, calendars, and/or any number of other components. In one embodiment, the available components may be display as tags. As an option, the tags may be linked to code for facilitating the use of such components with a web-based interface.

System Overview

Figure 6:
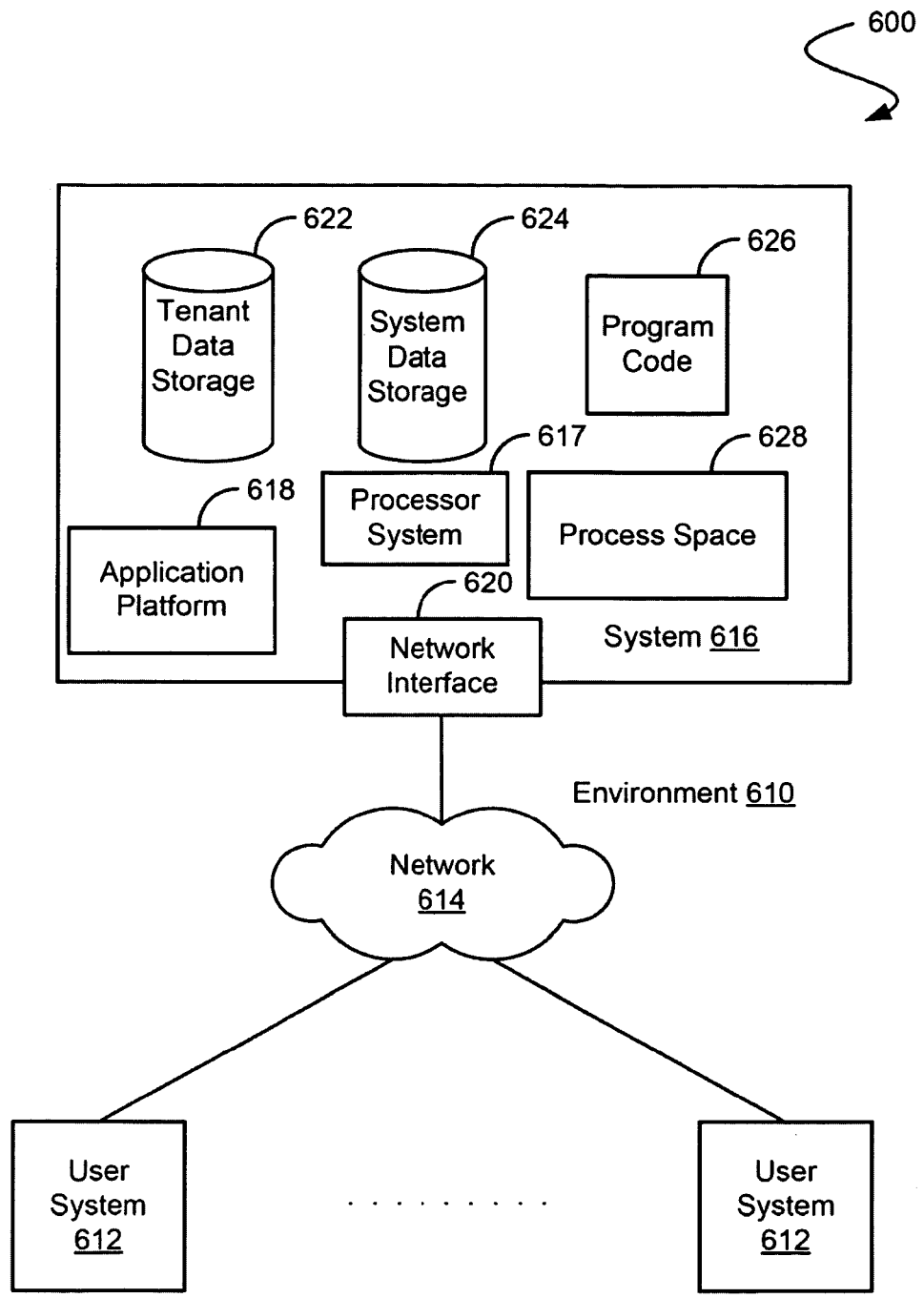
FIG. 6 illustrates a block diagram of an example of an environment wherein an on-demand database service might be used.

FIG. 6 illustrates a block diagram of an environment 610 wherein an on-demand database service might be used. As an option, any of the previously described embodiments of the foregoing figures may or may not be implemented in the context of the environment 610. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

Figure 7:
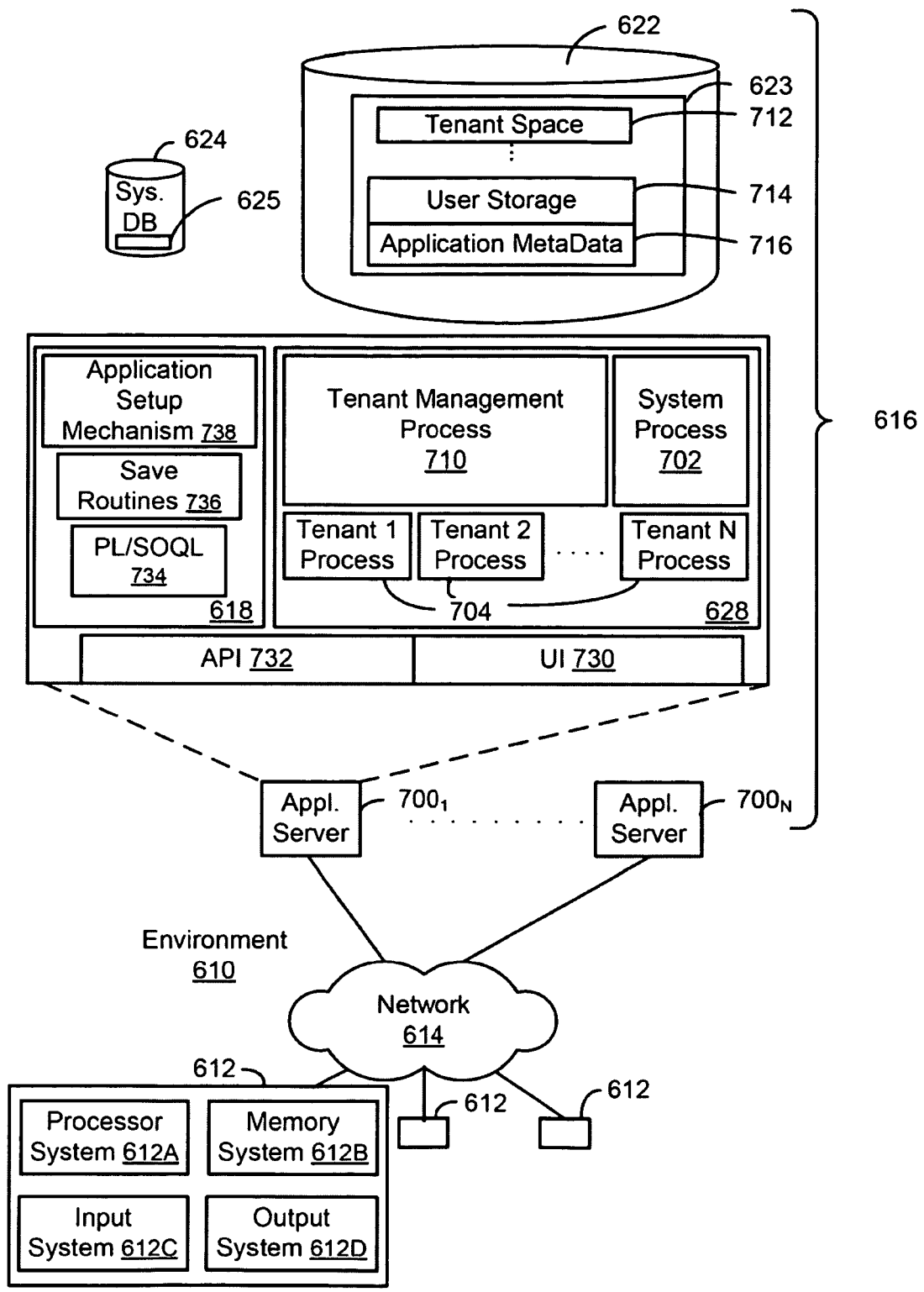
FIG. 7 illustrates a block diagram of an embodiment of elements of FIG. 6 and various possible interconnections between these elements.

One arrangement for elements of system 616 is shown in FIG. 7, including a network interface 620, application platform 618, tenant data storage 622 for tenant data 623, system data storage 624 for system data accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478, entitled "METHOD AND SYSTEM FOR ALLOWING ACCESS TO DEVELOPED APPLICATIONS VIA A MULTI-TENANT ON-DEMAND DATABASE SERVICE," issued Jun. 1, 2010 to Craig Weissman, and hereby incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 700, might be coupled via the network 614 (e.g., the Internet), another application server 700$_{N-1}$ might be coupled via a direct network link, and another application server 700$_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700.

In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g. in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g. an application server 700 in system 616) automatically generates one or more SQL statements (e.g. one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "CUSTOM ENTITIES AND FIELDS IN A MULTI-TENANT DATABASE SYSTEM", issued Aug. 27, 2010 to Craig Weissman, and hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
displaying a plurality of options each for configuring a different portion of a previously created graphical user interface associated with an on-demand database service;
receiving selection of one of the displayed options to configure an associated one of the portions of the previously created graphical user interface;
in response to the selection of the one of the displayed options, displaying an editor interface associated only with the selected one of the displayed options to configure the associated one of the portions of the previously created graphical user interface, where the editor interface displays text representative of the one of the portions of the previously created graphical user interface;
receiving, via the editor interface, a plurality of markup tags defining a customization of the one of the portions of the previously created graphical user interface by:
displaying within the editor interface a plurality of graphical user interface components associated with the one of the portions of the previously created graphical user interface and capable of being used for the customization of the one of the portions of the previously created graphical user interface, where each of the graphical user interface components is displayed as a different one of the plurality of markup tags;
receiving a selection of one of the graphical user interface components to be used for the customization of the one of the portions of the previously created graphical user interface; and
automatically receiving the markup tags and updating the displayed text representative of the one of the portions of the previously created graphical user interface with the markup tags inserted in response to the selection of the one of the graphical user interface components, wherein the markup tags define the customization of the one of the portions of the previously created graphical user interface by indicating the selected one of the graphical user interface components to be used for the customization of the one of the portions of the previously created graphical user interface; and
publishing a customized version of the previously created graphical user interface by substituting the one of the portions of the previously created graphical user interface with the customized one of the portions of the previously created graphical user interface;
wherein the plurality of graphical user interface components are displayed in a component interface separate from the editor interface, and the selected one of the graphical user interface components is selected and moved from the component interface into a window of the editor interface.

2. The method of claim 1, wherein the editor interface includes a web-based interface.

3. The method of claim 1, wherein the plurality of options are displayed and the selection of the one of the options is received utilizing a drop down menu.

4. The method of claim 1, wherein the graphical user interface components include a plurality of pre-defined graphical user interface components of a graphical user interface component library.

5. The method of claim 1, wherein the graphical user interface components are displayed in response to a request received from a user utilizing the editor interface.

6. The method of claim 1, wherein the customization of the one of the portions of the previously created graphical user interface defined by the markup tags includes a portion of an e-mail interface.

7. The method of claim 1, wherein the customization of the one of the portions of the previously created graphical user interface defined by the markup tags includes a portion of a search results interface.

8. The method of claim 1, wherein the customization of the one of the portions of the previously created graphical user interface defined by the markup tags includes a portion of a home page interface.

9. The method of claim 1, wherein the on-demand database service includes a multi-tenant on-demand database service.

10. The method of claim 1, wherein the previously created graphical user interface is a default user interface in which the portions of the previously created graphical user interface have default characteristics capable of being customized via the editor interface.

11. The method of claim 1, wherein the graphical user interface components are linked to code for facilitating use of the graphical user interface components with the graphical user interface.

12. The method of claim 1, wherein additional information corresponding to the selected one of the graphical user interface components is displayed upon selecting the graphical user interface component.

13. A non-transitory machine-readable medium carrying one or more sequences of instructions which, when executed by one or more processors, cause the one or more processors to carry out the steps of:
displaying a plurality of options each for configuring a different portion of a previously created graphical user interface associated with an on-demand database service;
receiving selection of one of the displayed options to configure an associated one of the portions of the previously created graphical user interface;
in response to the selection of the one of the displayed options, displaying an editor interface associated only with the selected one of the displayed options to configure the associated one of the portions of the previously created graphical user interface, where the editor interface displays text representative of the one of the portions of the previously created graphical user interface;

receiving, via the editor interface, a plurality of markup tags defining a customization of the one of the portions of the previously created graphical user interface by:

displaying within the editor interface a plurality of graphical user interface components associated with the one of the portions of the previously created graphical user interface and capable of being used for the customization of the one of the portions of the previously created graphical user interface, where each of the graphical user interface components is displayed as a different one of the plurality of markup tags;

receiving a selection of one of the graphical user interface components to be used for the customization of the one of the portions of the previously created graphical user interface; and automatically receiving the markup tags and updating the displayed text representative of the one of the portions of the previously created graphical user interface with the markup tags inserted in response to the selection of the one of the graphical user interface components, wherein the markup tags define the customization of the one of the portions of the previously created graphical user interface by indicating the selected one of the graphical user interface components to be used for the customization of the one of the portions of the previously created graphical user interface; and publishing a customized version of the previously created graphical user interface by substituting the one of the portions of the previously created graphical user interface with the customized one of the portions of the previously created graphical user interface;

wherein the plurality of graphical user interface components are displayed in a component interface separate from the editor interface, and the selected one of the graphical user interface components is selected and moved from the component interface into a window of the editor interface.

14. An apparatus, comprising:

a processor; and one or more stored sequences of instructions which, when executed by the processor, cause the processor to carry out the steps of:

displaying a plurality of options each for configuring a different portion of a previously created graphical user interface associated with an on-demand database service;

receiving selection of one of the displayed options to configure an associated one of the portions of the previously created graphical user interface;

in response to the selection of the one of the displayed options, displaying an editor interface associated only with the selected one of the displayed options to configure the associated one of the portions of the previously created graphical user interface, where the editor interface displays text representative of the one of the portions of the previously created graphical user interface;

receiving, via the editor interface, a plurality of markup tags defining a customization of the one of the portions of the previously created graphical user interface by:

displaying within the editor interface a plurality of graphical user interface components associated with the one of the portions of the previously created graphical user interface and capable of being used for the customization of the one of the portions of the previously created graphical user interface, where each of the graphical user interface components is displayed as a different one of the plurality of markup tags;

receiving a selection of one of the graphical user interface components to be used for the customization of the one of the portions of the previously created graphical user interface; and automatically receiving the markup tags and updating the displayed text representative of the one of the portions of the previously created graphical user interface with the markup tags inserted in response to the selection of the one of the graphical user interface components, wherein the markup tags define the customization of the one of the portions of the previously created graphical user interface by indicating the selected one of the graphical user interface components to be used for the customization of the one of the portions of the previously created graphical user interface; and publishing a customized version of the previously created graphical user interface by substituting the one of the portions of the previously created graphical user interface with the customized one of the portions of the previously created graphical user interface;

wherein the plurality of graphical user interface components are displayed in a component interface separate from the editor interface, and the selected one of the graphical user interface components is selected and moved from the component interface into a window of the editor interface.

15. A method for transmitting code for use in a multi-tenant database system on a transmission medium, the method comprising:

transmitting code for displaying a plurality of options each for configuring a different portion of a previously created graphical user interface associated with an on-demand database service;

transmitting code for receiving selection of one of the displayed options to configure an associated one of the portions of the previously created graphical user interface;

transmitting code for in response to the selection of the one of the displayed options, displaying an editor interface associated only with the selected one of the displayed options to configure the associated one of the portions of the previously created graphical user interface, where the editor interface displays text representative of the one of the portions of the previously created graphical user interface;

transmitting code for receiving, via the editor interface, a plurality of markup tags defining a customization of the one of the portions of the previously created graphical user interface by:

displaying within the editor interface a plurality of graphical user interface components associated with the one of the portions of the previously created graphical user interface and capable of being used for the customization of the one of the portions of the previously created graphical user interface, where each of the graphical user interface components is displayed as a different one of the plurality of markup tags;

receiving a selection of one of the graphical user interface components to be used for the customization of the one of the portions of the previously created graphical user interface; and automatically receiving the markup tags and updating the displayed text representative of the one of the portions of the previously created graphical user interface with the markup tags inserted in response to the selection of the one of the graphical user interface components, wherein the markup tags define the customization of the one of the portions of the previously created graphical user interface by indicating the selected one of the graphical user interface components to be used for the customization of the one of the portions of the previously created graphical user interface; and transmitting code for publishing a customized version of the previously created graphical user interface by substituting the one of the portions of the previously created graphical user interface with the customized one of the portions of the previously created graphical user interface;

wherein the plurality of graphical user interface components are displayed in a component interface separate from the editor interface, and the selected one of the graphical user interface components is selected and moved from the component interface into a window of the editor interface.

\* \* \* \* \*